US006198633B1

(12) United States Patent
Lehman et al.

(10) Patent No.: US 6,198,633 B1
(45) Date of Patent: Mar. 6, 2001

(54) COMPUTER SYSTEM AND ENCLOSURE THEREOF (75) Inventors: Bret W. Lehman; Anthony Wayne Miles, both of Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/118,741

(22) Filed: Jul. 17, 1998

Related U.S. Application Data
(60) Provisional application No. 60/080,253, filed on Apr. 1, 1998.

(51) Int. Cl.[7] ....................................................... H05K 5/00
(52) U.S. Cl. .......................... 361/756; 361/756; 361/801; 361/802; 312/332.1; 312/334.5; 312/334.7
(58) Field of Search .................................. 361/726, 727, 361/730, 752, 753, 756, 788, 796, 797, 801–802; 312/223.2, 332.1, 334.5, 334.7, 334.16

(56) References Cited

U.S. PATENT DOCUMENTS

| | | | |
|---|---|---|---|
| 4,916,578 | 4/1990 | Mast | 361/424 |
| 5,175,669 | 12/1992 | Navia et al. | 361/390 |
| 5,218,514 | 6/1993 | Huynh et al. | 361/384 |
| 5,460,441 | * 10/1995 | Hastings et al. | 312/298 |
| 5,519,573 | 5/1996 | Cobb et al. | 361/686 |
| 5,596,483 | 1/1997 | Wyler | 361/683 |
| 5,600,538 | 2/1997 | Xanthopoulos | 361/683 |
| 5,726,864 | * 3/1998 | Copeland et al. | 361/800 |
| 5,808,876 | * 9/1998 | Mullenbach et al. | 361/788 |
| 5,896,273 | * 4/1999 | Varghese et al. | 361/724 |
| 5,980,003 | * 11/1999 | Huang | 312/223.2 |
| 6,038,126 | * 3/2000 | Weng | 361/679 |

* cited by examiner

Primary Examiner—Jeffrey Gaffin
Assistant Examiner—Tuan Dinh
(74) Attorney, Agent, or Firm—Joscelyn G. Cockburn

(57) ABSTRACT

The enclosure includes a base section fabricated from a single piece of material, such as sheet metal, in which multiple design details are punched and formed. A cover section with tabs for inserting in slots formed in the base section is provided. A one-piece card cage including injector/ejector latching details and card guide rails is connected via welding or other means to the base section. An enabler assembly, including guide rails, is fastened to the card cage and configures the card cage into multiple adapter receiving cavities.

24 Claims, 8 Drawing Sheets

COMPUTER SYSTEM AND ENCLOSURE THEREOF

CROSS REFERENCE TO RELATED PATENT APPLICATION

This application claims benefit of Provisional application Ser. No. 60/080,253, filed Apr. 1, 1998. The present patent application relates to patent application Ser. No. 60/080,280, filed on Apr. 1, 1998, filed currently herewith and assigned to the assignee of the present invention.

BACKGROUND OF THE INVENTION

Cross Reference to Related Patent Application

The present patent application relates to patent application Ser. No. 60/080,280, filed on Apr. 1, 1998. filed currently herewith and assigned to the assignee of the present invention.

Field of the Invention

The present invention relates to electronic packaging in general and, in particular, to electronic packaging of Personal Computers (PC) and other network interconnecting devices.

Prior Art

Personal computers and network interconnecting devices such as routers, concentrators, etc. typically have an enclosure in which several components are mounted. Typical components include blowers, hard disk, motherboard, circuit cards, etc. Most of the designs are roll-your-own in that each manufacturer designs its machines to its own liking without regard for interchangeability of parts from other manufacturers. Examples of prior art machines are set forth in U.S. Pat. Nos. 4,916,578; 5,175,669; 5,218,514; 5,519,573; 5,596,483 and 5,600,538.

U.S. Pat. No. 4,916,578 (Personal Computer Chassis Connection Method). This patent shows a box that uses a sliding 4-sided top cover over a 3-sided base with a special interlock detail for EMC sealing. The adapters are vertically oriented and top pluggable, requiring removal of the top cover first. The corner EMC seal is a contact clip.

U.S. Pat. No. 5,175,669 (Support Member that Couples an Electronic Card to a Chassis). This patent shows a mechanism for retaining an adapter card which is installed into a box from the top. The top cover would have to be removed to access the adapter. The mechanism would probably be molded plastic so that it can flex to snap into the retaining slots in the box base. The adapters plug into a mother board and are oriented vertically in the box.

U.S. Pat. No. 5,218,514 (Compact High Power Personal Computer with Improved Air Cooling System). This patent describes a cooling system for a personal computer box that pulls air in through apertures in the front and blows it out the back. It also describes the location of the components within the box such as the power supply and riser board and I/O cards which are horizontally oriented. The patent seems very specific to the product it describes.

U.S. Pat. No. 5,519,573 (I/O Riser Card for Motherboard in Personal Computer/Server). This patent shows a mother board with a vertically oriented riser board for I/O connection attached. The riser board has an EMC gasket (40) mentioned. The description is a compliant die-cut part which has connector exit openings and is sandwiched between the outer box case.

U.S. Pat. No. 5,596,483 (Silent Air Cooled Computer . . . ). This patent claims a very specific means for cooling a hard drive which apparently also reduces noise levels. It claims a fan which is adhesively mounted to an elastic gasket. It also claims a hard drive with a fluid containing pouch.

U.S. Pat. No. 5,600,538 (Personal Computer and Housing Structure . . . ). This patent describes an Apple® computer with removable decorative panels and with a removable mother board with a sub-chassis mounted on top. The disk drives are mounted on slides which are accessible from the front exterior of the box after a decorative panel is removed. The patent appears very specific to the Apple product.

There seems to be a trend, in the computer and communications industries, toward open systems whereby hardware would be compatible with other hardware no matter what company makes it. To foster this interchangeability, several companies have formed a consortium called PCI Industrial Computer Manufacturers Group (PICMG™) which promulgates the CompactPCI® (Peripheral Component Interconnect) specification that uses industry standard mechanical components and high performance connector technologies to provide a system intended for rugged environments. Included in the specification is a standard form factor for adapters or boards. Both 3U (100 mm by 160 mm) and 6U (233.35 mm by 160 mm) board sizes are defined. More details are set forth in the standard which is incorporated herein by reference.

Even though the specification is a step in the right direction in that electronics are packaged on a standardized board that fits enclosures from different manufacturers, the enclosures themselves are built on a "roll-your-own" interchangeable component design. Kits containing mechanical parts for the enclosures can be purchased and assembled. The enclosures are usually expensive due to high cost for the mechanical components and labor costs for manually assembling them. In addition, the fit between parts are variable due to tolerances and to variable assembly positions. Moreover, the appearances are not pleasing; thus, requiring covers that further augment the overall cost. Finally, these "tinker-toy like" enclosures are not very good in providing EMI shielding.

SUMMARY OF THE INVENTION

It is the main object of the present invention to provide a low cost universal mechanical enclosure for use with electrical machines.

It is another object of the present invention to provide a mechanical enclosure that accepts adapter cards designed to comply with the CompactPCI standard.

The enclosure includes a base section fabricated from a single piece of material, such as sheet metal, in which multiple design details are punched and formed. A cover section with tabs for inserting in slots formed in the base section is provided. A one-piece card cage including injector/ejector latching details and card guide rails is connected via welding or other means to the base section. An enabler assembly, including guide rails, is fastened to the card cage and configures the card cage into multiple adapter receiving cavities.

In one feature of the invention, the enabler configures the card cage into at least one large adapter receiving cavity.

In another feature of the invention, machine sub-assemblies, including injector/ejector, circuit boards or circuit cards, electrical connectors, etc., are inserted in all or selected ones of the adapter receiving cavities.

The universal enclosure can be rack mounted or placed on a table top. The universal enclosure fits vertically within two rack unit space (approximately 3.5 inches).

DETAILED DESCRIPTION OF THE PREFERRED EMBODIMENT OF THE INVENTION

Figure 1:
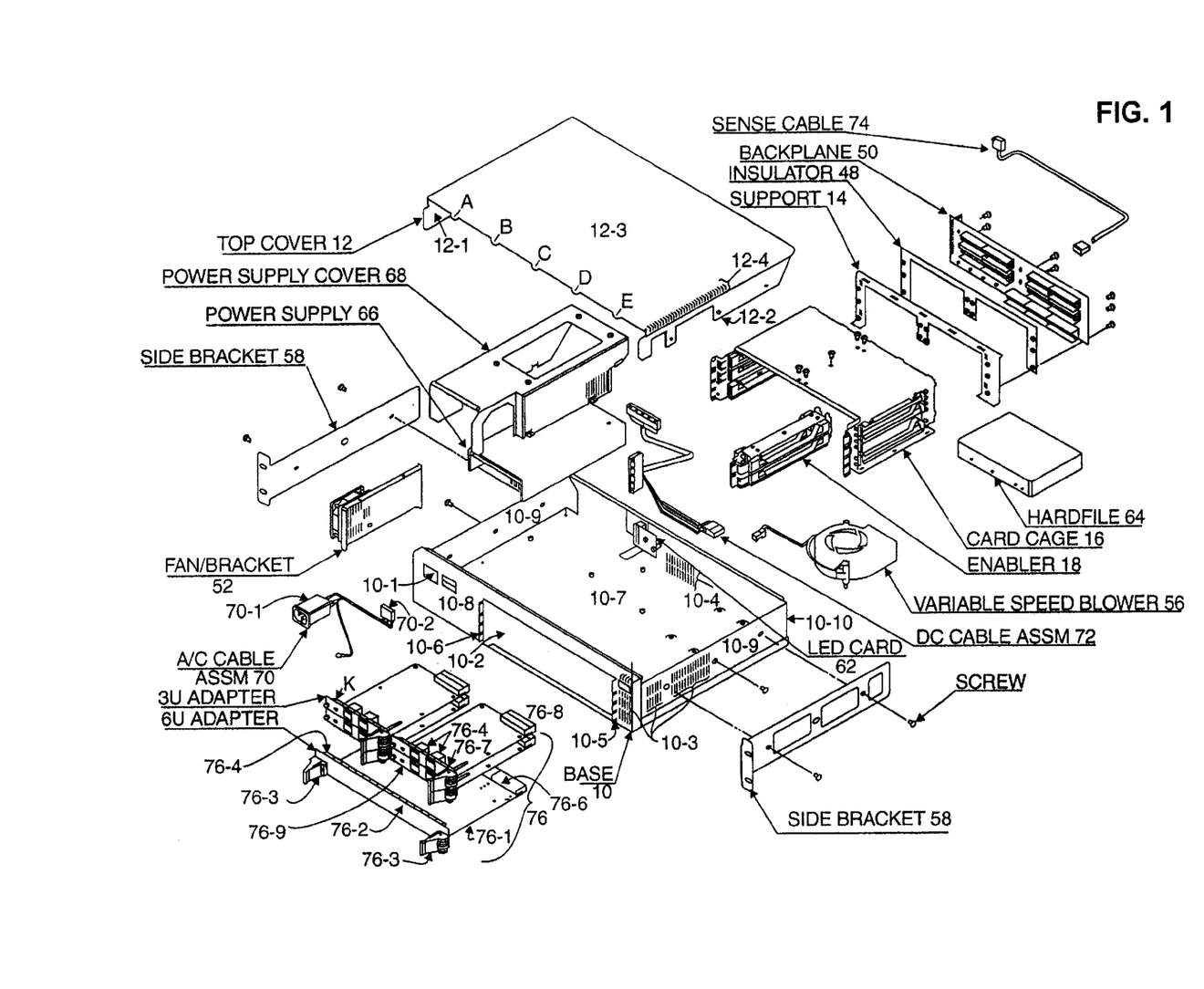
FIG. 1 shows an exploded view of an electrical machine, including the enclosure, according to the teachings of the present invention.

FIG. 1 shows an exploded view of the electrical machine according to the teachings of the present invention. The electrical machine could be a bridge, router, hub, or any of the well-known interconnecting devices used in networking technology. The electrical machine includes a housing or enclosure, internal components, electrical components, EMC Shielding system, electrical grounding system and mounting system which mounts the electrical machine in a rack.

The housing includes Base 10, Top Cover 12, Support 14, Card Cage 16 and Enabler 18. The Base 10 is fabricated from a single piece of material (i.e., sheet metal) in which multiple design details are placed. The single piece of material with the design details is then formed into a desired mechanical structure. With reference to FIG. 1, the multiple design details include Openings 10-1 and 10-2, Air Inlet Slots 10-3, Air Outlet (exhaust) Slots 10-4, holes for receiving fasteners, Vertical Flanges 10-5 and 10-6, etc. The Opening 10-2 forms the entry where adapter cards are inserted into the housing. The Vertical Flanges 10-5 and 10-6 form the attachment point whereat other components (to be described later) are connected to the base. The base includes a Bottom Surface 10-7, Front Wall 10-8, Back Wall 10-10 and Sidewalls 10-9.

Figure 7:
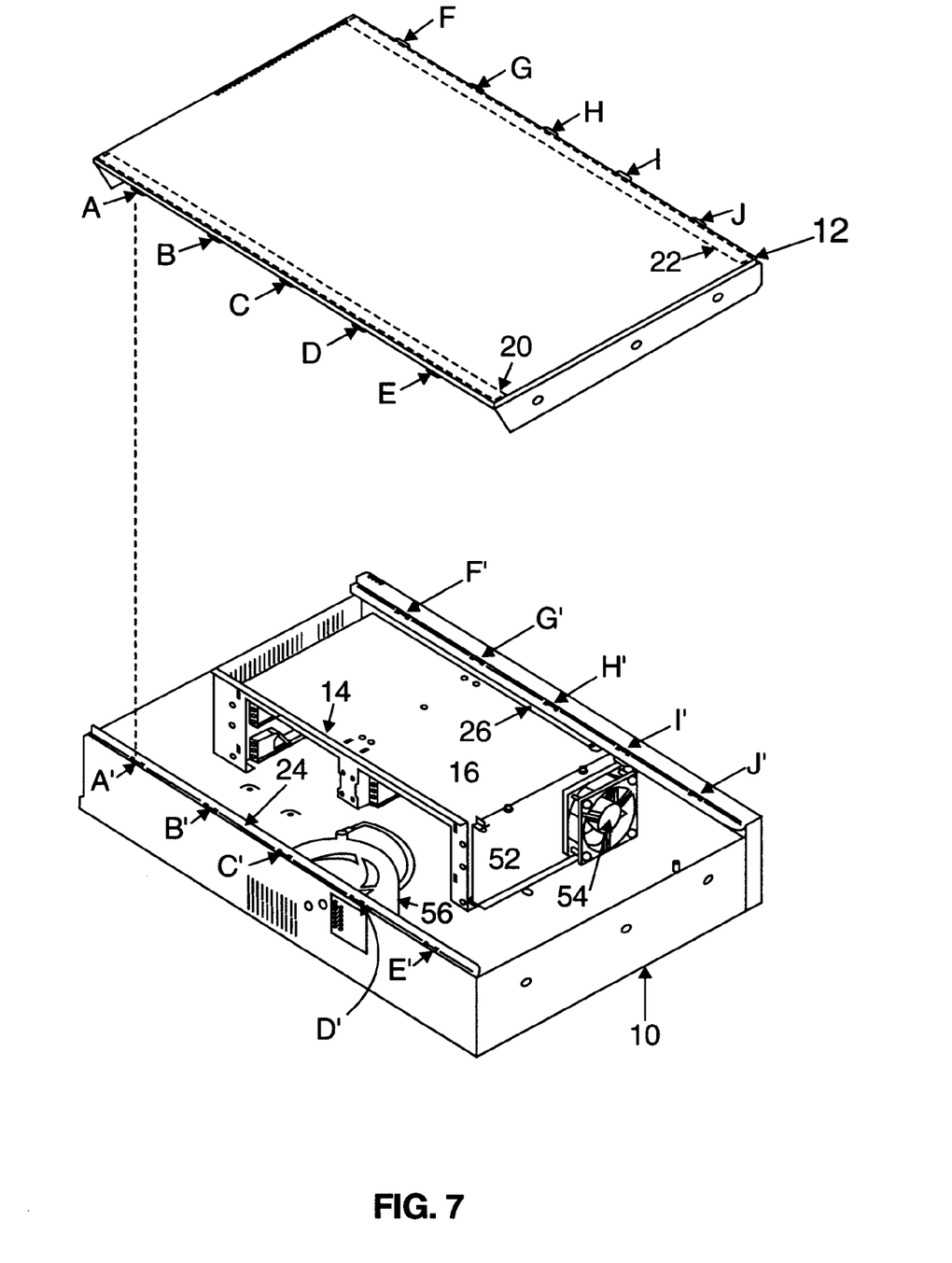
FIG. 7 is a pictorial view showing alignment between cover section and base section.

The Cover Section 12 includes a single piece of material (such as sheet metal) formed into a mechanical structure having Sidewalls 12-1 and 12-2, Top Surface 12-3, Air Slots 12-4, and Vertical Tabs A through E. Turning to FIG. 7 for the moment, Top Cover 12 also includes a plurality of Horizontal Tabs F through J. The vertical and horizontal tabs are on opposite edges of the Top Cover 12. A plurality of Vertical Slots A' through E' are fabricated in the Base 10. Similarly, a plurality of Horizontal Slots F' through J' are fabricated on the Base 10. The dotted line between Tab A and Slot A' indicates that when the Cover 12 is mated or positioned within the base, the Vertical Tabs A through E mate with respective ones of the Vertical Slots A' through E'. Similarly, the Horizontal Tabs F through J mate with Horizontal Slots F' through J'.

The fit of the cover to the base is tight and, consequently, electromagnetic radiation into the box or out of the box is contained. As will be explained in further detail below, EMC Shielding is further enhanced by Gaskets 20 and 22, respectively. In the preferred configuration, the gaskets are positioned on the undersurface of the top cover and coact with Flanges 24 and 26 on the Base 10 to form a perfect seal.

Figure 2:
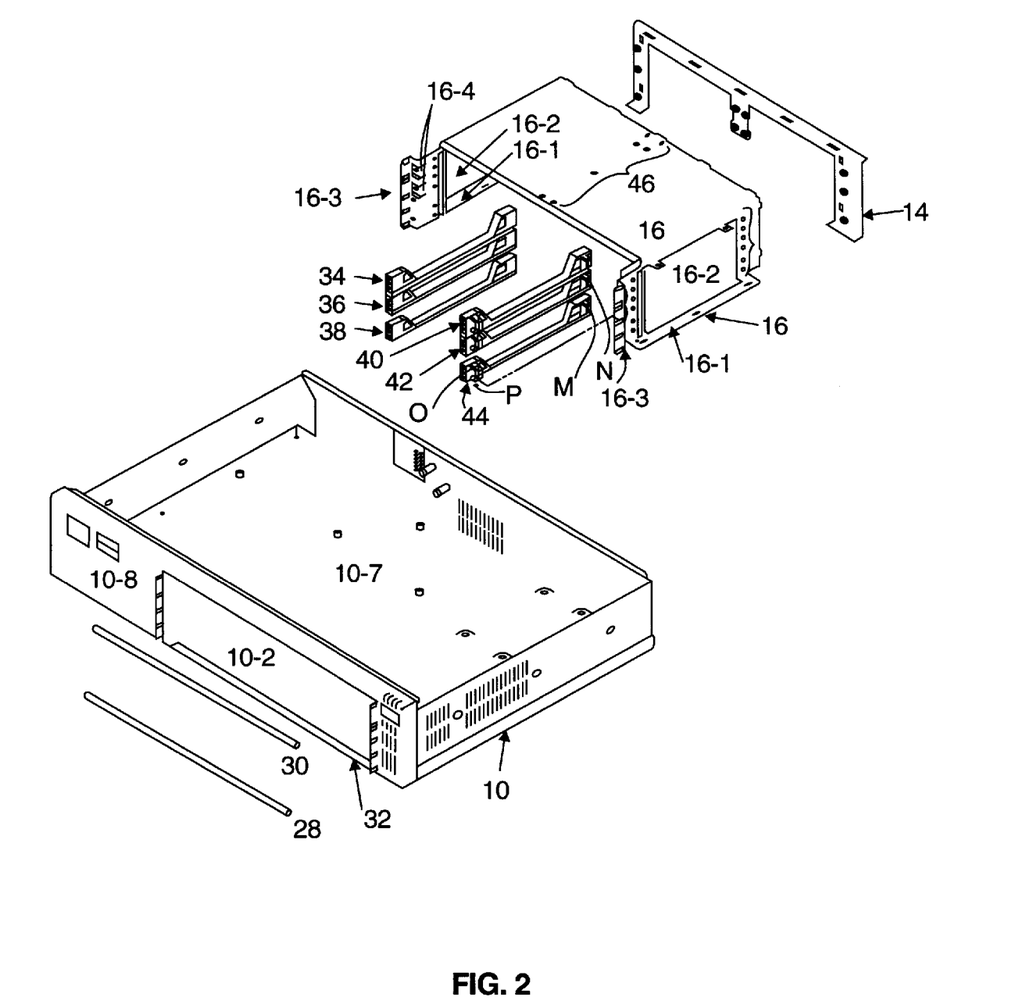
FIG. 2 shows an exploded view of the selected components according to the teachings of the present invention.

Turning to FIG. 2 for the moment, in addition to Gaskets 20 and 22 discussed above, the EMC Shielding system further includes Gaskets 28 and 30. Gasket 28 is fitted on Surface 10-7 next to Short Flange 32. Gasket 30 is fitted at the top of Opening 10-2 next to a short flange (not shown) extending inwardly from Front Wall 10-8. As will be explained subsequently, Gasket 30 coacts with Conductive Springs K and L on the adapter assembly 76 (FIG. 1) to form a tight seal; thus, inhibiting radiation from escaping or entering into the box. Preferably, the gaskets are fabricated from conductive material which further enhances the shielding characteristics.

Figure 3:
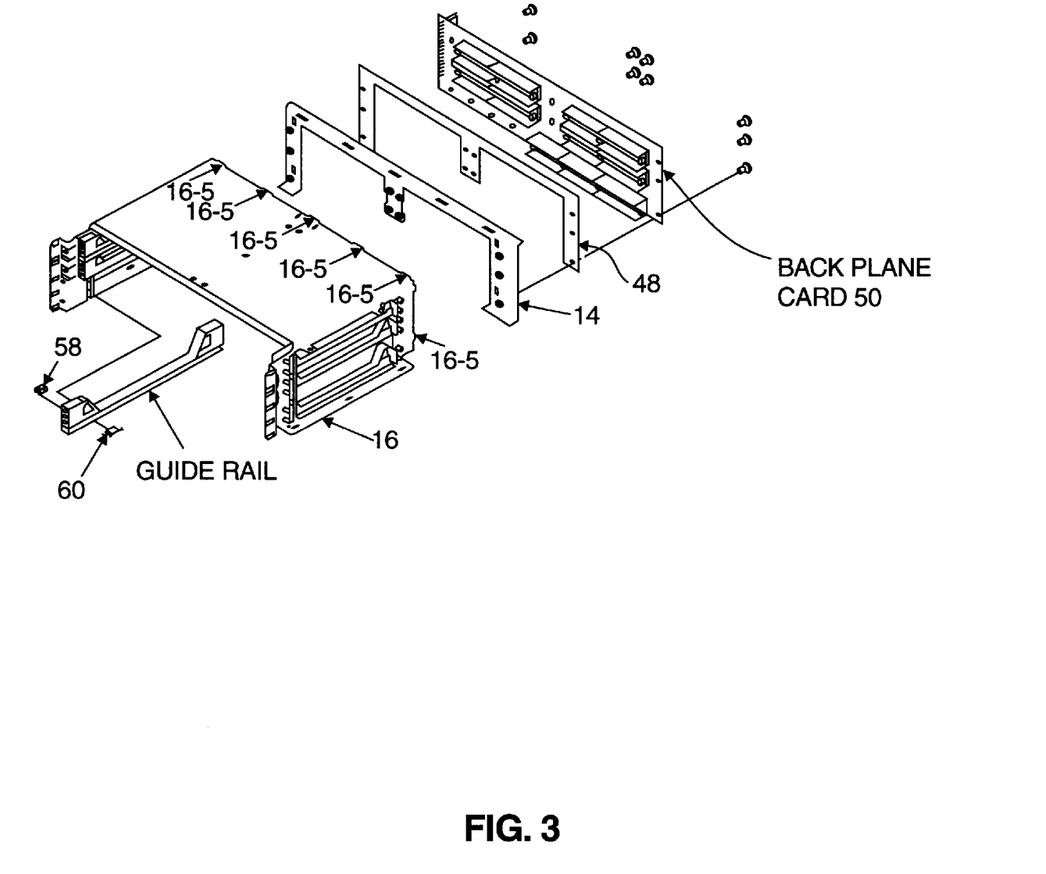
FIG. 3 shows another exploded view of selected components according to the teachings of the present invention.

Referring to FIGS. 1, 2 and 3, the Card Cage 16, when mounted to Base 10, forms an enclosure in which adapter cards are inserted. The Card Cage 16 is fabricated from a single piece of material (such as sheet metal) in which multiple design details are fabricated and the single sheet material with the design details are formed into the mechanical structure shown in the figures. The mechanical structure includes Flange 16-1 (FIG. 2) with holes for mounting to the Bottom Surface 10-7 of Base 10. Openings 16-2 are fabricated in the one piece material. Mounting Provisions 16-3 and 16-4 are fabricated on opposite sides of each of the Openings 16-2. Preferably, the mounting positions are holes for snapping in commercially available Card Guides 34, 36, 38, 40, 42 and 44. Since the relationship of each card guide and the card cage are identical, only one will be described, it being understood that the others are arranged in a similar configuration.

With reference to FIG. 2, Card Guide 44 is provided with a pair of Mounting Posts M and N, 0 and P on each end. The mounting posts coact with spaced openings on the card cage to provide the rails upon which the adapter or board or card assembly slides when it is inserted in the box. With reference to FIG. 2, when Card Guide 44 is positioned in Hole 6-2, Posts M and N is inserted in the lower two openings in Mounting Provision 16-4. Similarly, Posts O and P are snapped into the lowermost openings of Mounting Provision 16-3. The other card guides are inserted in their respective holes and positions in a similar manner, and when assembled, the configuration is shown in FIG. 1 and FIG. 3.

Still referring to FIGS. 1, 2 and 3, the card cage is provided with Openings 46. The Openings 46 provide attachment points for the Enabler 18 (details to be given below). Suffice it to say at this point, in the preferred embodiment, a set of screws shown in FIG. 1 mount the Enabler 18 to Top Surface 16' of the card cage. The enabler divides the cavity formed between the base and the card cage into several receptacle cavities in which different size adapter card assemblies can be inserted. The card cage is further fabricated with Injector/Ejector Latching Details 16-3 (details to be given hereinafter) which coact with levers on the adapter assembly to create leverage to insert or eject an adapter from its associated cavity. The card cage also includes specially formed Flanges 16-4 with threaded holes or clench nuts installed to provide an attachment point that can be used to retain adapters during shipping or for maintaining consistent contact between the adapter brackets and the surface from which the flange is formed 16-5. The Support 14 is attached by welding to the rear of Card Cage 16. A plurality of tabs, some of which are identified by numeral 16-5, are fabricated on the rear of Card Cage 16.

The tabs are inserted in spaced slots on Support 14 when it is mounted to the card cage.

Turning to FIG. 7 for the moment, the rear section of Card Cage 16 and the attached Bracket 14 is shown. An Insulator 48 (FIG. 1) is mounted to the Support 14 and provides electrical isolation between the Backplane 50 and the Support 14. As will be described below, the Backplane 50 provides the electrical facility for electrically coupling the circuit cards. A Fan Bracket 52 is mounted to the card cage and a Fan 54 is mounted to the Fan Bracket 52. The Fan 54 and Variable Speed Blower 56 provide cooling for the box. A pair of Side Brackets 58 (FIG. 1) are mounted to the Base 10 by screws and the brackets are used for mounting the machine in a rack (not shown). Of course, other types of mounting systems can be used for attaching the electrical machine without deviating from the scope of spirit of the present invention.

Figure 5A:
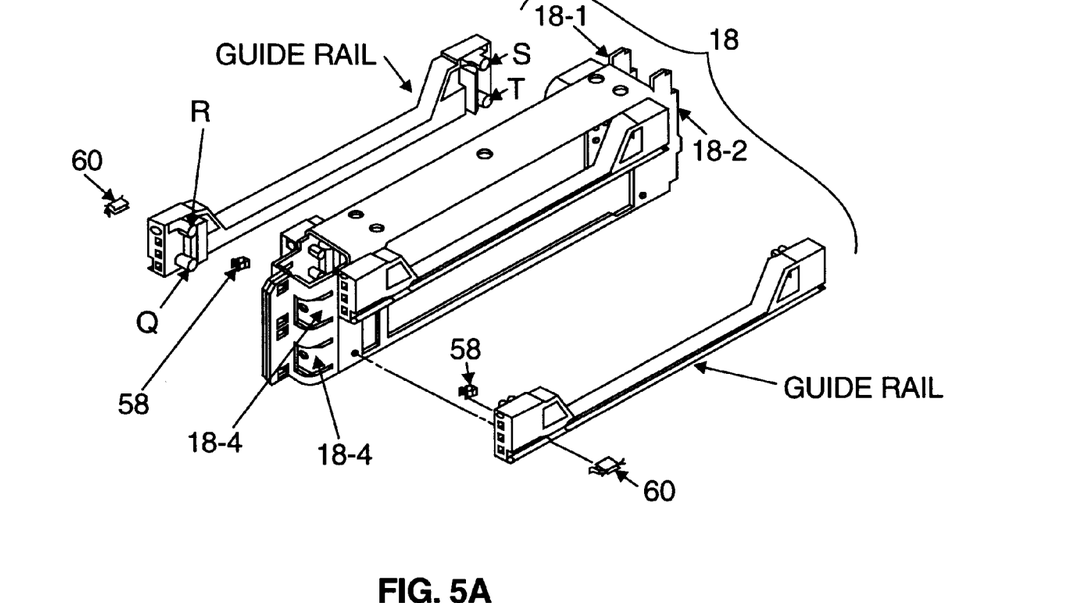
FIGS. 5A and 5B show details of the enabler.
Figure 5B:
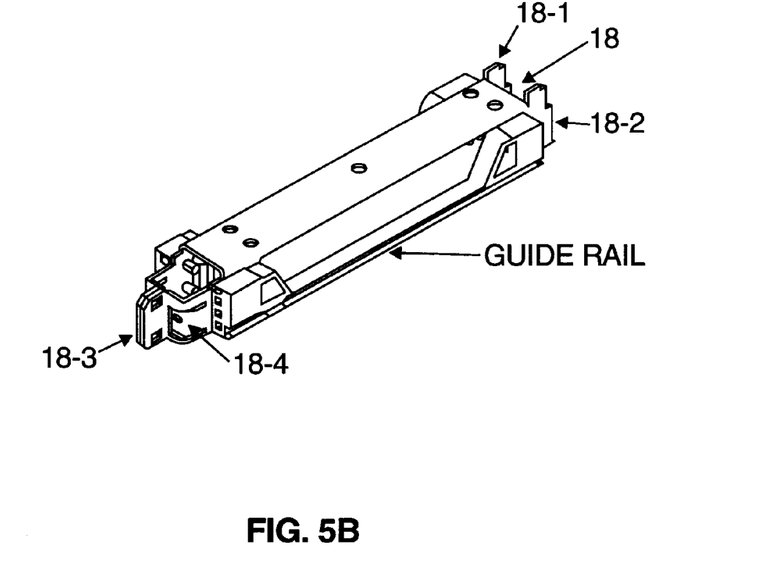

Referring again to FIGS. 1, 5A and 5B, the Enabler 18 is shown. As stated previously, the Enabler 18 is mounted by screws to Card Cage 16 and separates the card receiving cavities into a plurality of independent cavities in which different size cards can be inserted. The enabler can be one high (FIG. 5B) in which it divides the cavity into spaces for two small size adapters (referred to in CompactPCI lingo as "3U" adapter) and one large adapter (referred to as a "6U" adapter). Likewise, the enabler comes in double high (FIGS. 1 and 5A) in which it divides the receiving cavity in the box into cavities for four (4) small adapters and a cavity for a large adapter. The Enabler 18 is fabricated from metal and includes a frame with holes on the top surface for mounting to the card cage. Vertical Flanges 18-1 and 18-2 are fabricated on one end and are used for mounting to Card Cage 16. The opposite end of the enabler includes Injector/Ejector Latching Details 18-3, similar to the details described above relative to Card Cage 16. Flanges 18-4 with threaded holes for retaining adapter cards are fabricated on one end. The adapter card restraints are similar to the restraint previously described relative to the Card Cage 16. Four pairs of holes (for the double enabler) are fabricated on the opposite ends of the enabler. The holes are positioned so that two pairs are on opposite sides on each end of the enabler. The holes receive the mounting post that are located on opposite ends of the guide rail. With reference to FIG. 5A, two pairs of mounting posts, Q, R, S and T, are shown on opposite ends of a guide rail. The mounting posts are snapped into holes (previously described) on the frame of the enabler. The same pattern of holes and posts are positioned on each of the guide rails and on the enabler frame, respectively. In FIG. 5A, a guide rail is shown in place on the enabler and two rails are shown displaced from the enabler. When the two high enabler is assembled, it appears as it is shown in FIG. 1. The single high assembled enabler is shown in FIG. 5B.

One of the important features of this electrical machine is that it has a electrical grounding system built in the mechanical structure. The electrical grounding system is shown in FIGS. 3 and 5A of the drawings. Each of the guide rails is independently grounded by the grounding system including Metal Members 58 and 60. The Metal Member 58 is inserted on one side of the guide rail and rides against the metal frame on the enabler and the metal frame of the card cage. The Metal Member 60 is inserted through opening 18-5, on the opposite side of the guide rail, to contact the enabler metal frame. The Metal Member 60 rides against a metal stripe that is positioned on the adapter card when it is inserted in the cavity formed by the enabler. Thus, the grounding of the card is effectuated by Metal Member 60 contacting the metal strip, on the card, and contacting the metal frame, of the enabler, which is tied or connected to the Base 10 of the box. Thus, an effective grounding system is provided by the present invention.

Referring again to FIG. 1, another feature of the electrical machine according to the teachings of the present invention is the packaging of electrical components which are mounted within the enclosure. Electrical components includes LED Card 62, Hardfile 64, Power Supply 66, Power Supply Cover 68, Backplane 50 and a plurality of interconnecting conductors including AC Cable Assembly 70, DC Cable Assembly 72, and Sense Cable Assembly 74. The Power Supply 66 provides power to the box and is mounted to Power Supply Cover 68. The Power Supply Cover 68 is mounted to cover the power supply. The Hardfile 64 is a standard magnetic recording device which carries information that is stored by the system. Hardfile 64 and its use are well known and further detail will not be given. Suffice it to say that the hardfile is also mounted as one of the internal components of the electrical machine. The Backplane 50 is mounted by screws to Support 14. The Backplane 50 includes a plurality of connectors and internal busses and transmission wires also called lands which is used to transport electrical signals representative of data between the respective connectors on the backplane. As described above, both the Variable Speed Blower 56 and the fan mounted to Fan Bracket 52 are used for moving cooling air through the box. Preferably, the variable speed blower exits air through Slot 10-4 and the blower pulls in air through the slots such as 10-5, 10-3, in the Base 10. The DC Cable Assembly 72 has connectors that are connected to the power supply and connectors for connecting to the hardfile. Likewise, AC Cable Assembly 70 has AC Receptacle 70-1 which is fitted into Opening 10-1 and Connector 70-2 is inserted into the power supply.

Referring again to FIG. 1, a stack of Adapters 76 is shown. This stack represents the maximum number of adapter cards that can be inserted in the box. It should be noted that not all of the adapter cards need to be inserted at any one time. The number inserted, which might be 1, 2 or all, are dependent upon the user and the function of the box. The Stack 76 includes a large adapter card referred to by the CompactPCI standard as a 6U Adapter, and four smaller cards referred to as 3U Adapters in the CompactPCI standard. The size of the 6U Adapter is approximately 233.35×160×30.48 mm and the size of each of the 3U Adapters is approximately 100×160×20.32 mm.

Still referring to FIG. 1, the 6U Adapter Card includes a Substrate 76-1 on which a plurality of electronic components interconnected to perform desired functions are placed. This large size card, for example, could be system card carrying components to provide the main function of a system; such as a router, bridge or similar networking devices. A Bracket 76-2 is connected to Card 76-1 and Injector/Ejector Levers 76-3 are connected to Bracket 76-2. Conductive Springs 76-4 is mounted to the bracket and coacts with like springs mounted on the brackets of the 3U Adapter cards to provide EMI shielding. Of course, the contact between the respective conductive springs occur when the cards are inserted in the box. A set of Connectors 76-6 are connected to the card on its rear edge. When the card is inserted in the box, the Edge Connector 76-6 coacts with connectors on the Backplane 50 to provide communication between the electrical circuitry on the 6U Adapter Card and other circuitry in the box or outside of the box.

Still referring to FIG. 1, the 3U Adapters are all identical, therefore, the description of one is intended to cover the description of all. Similar to the 6U Adapter Card, the 3U Adapter Cards include a Substrate 76-7 on which a plurality of electrical circuits for performing a particular function is fabricated. Connector 76-8 is mounted on the rear edge of the card. The Connector 76-8 coacts with connectors mounted on the Backplane 50. Connectors 76-9 are mounted to the bracket of the connector and coact with conductors not shown for bringing signals into and away from the card. An adapter bracket with appropriate Shielding Spring L and injector/ejectors levers are attached to each of the cards. The injector/ejector levers allow the insertion/de-insertion of the card from the backplane.

Figure 4:
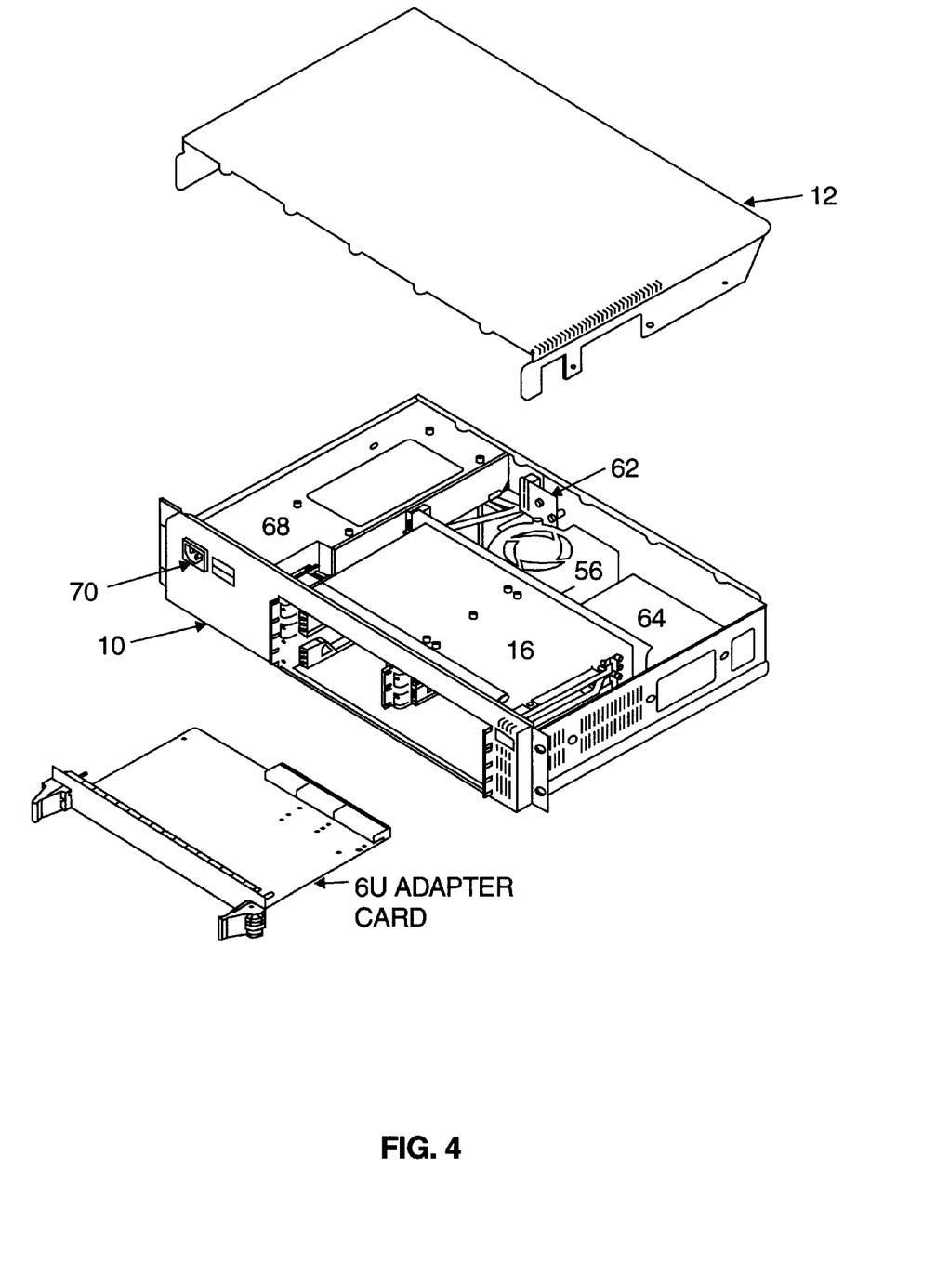
FIG. 4 shows a partially assembled machine according to the teachings of the present invention.

FIG. 4 shows an assembled prospective view of the electrical machine according to the teachings of the present invention. The elements in the figure are identified by common numerals previously described. Therefore, description of the elements are not repeated. The 6U Adapter Card is shown removed from the box. The small 3U Adapters Cards are not shown in this figure.

Figure 6A:
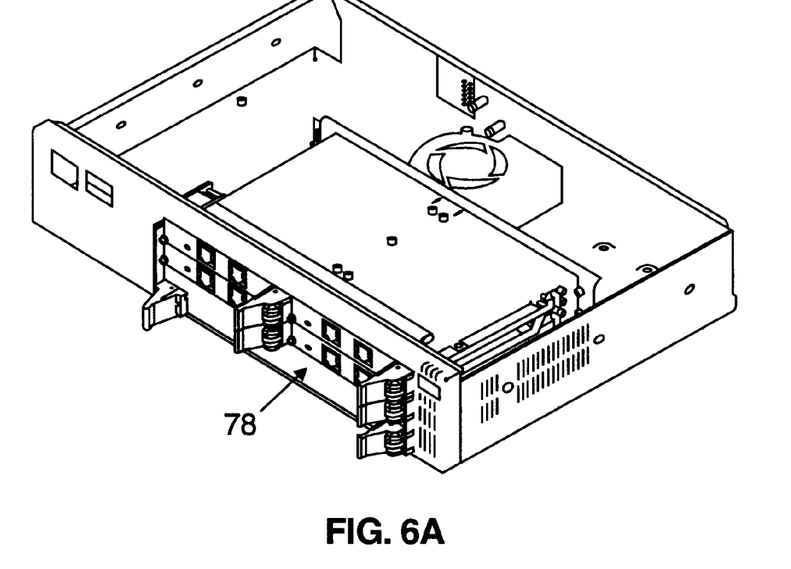
FIGS. 6A and 6B show partially assembled machines with different sizes and different numbers of circuit boards inserted in the card cage receiving cavities.
Figure 6B:
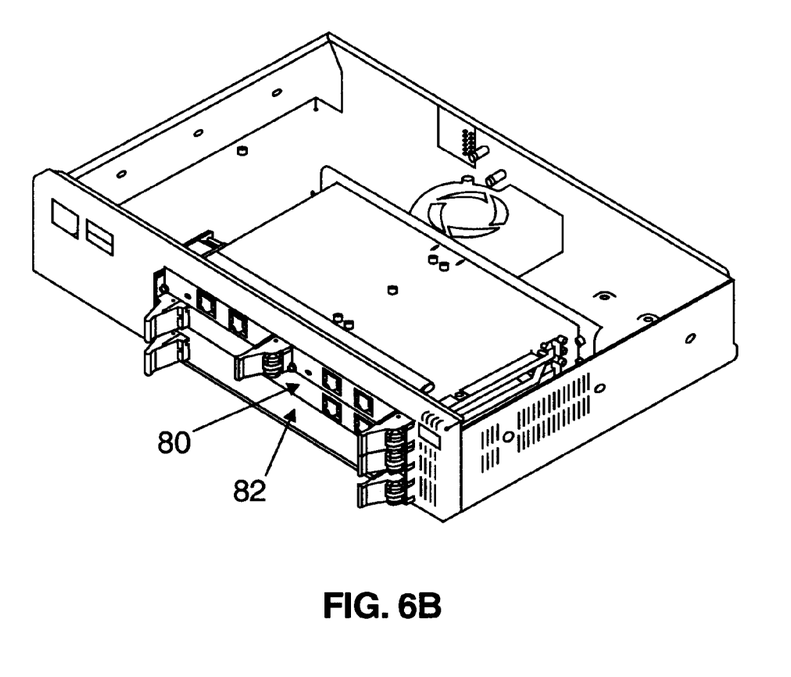

FIGS. 6A and 6B show the electrical machine populated with the adapter cards. In FIG. 6A, the population includes four small (3U) adapter cards and one system (6U) adapter card. In FIG. 6B, the population includes two 3U Adapter Cards and two large 6U Adapter Cards. The 6U Adapter Cards are identified by numeral 78 in FIG. 6A, and numerals 80 and 82 in FIG. 6B.

Figure 8:
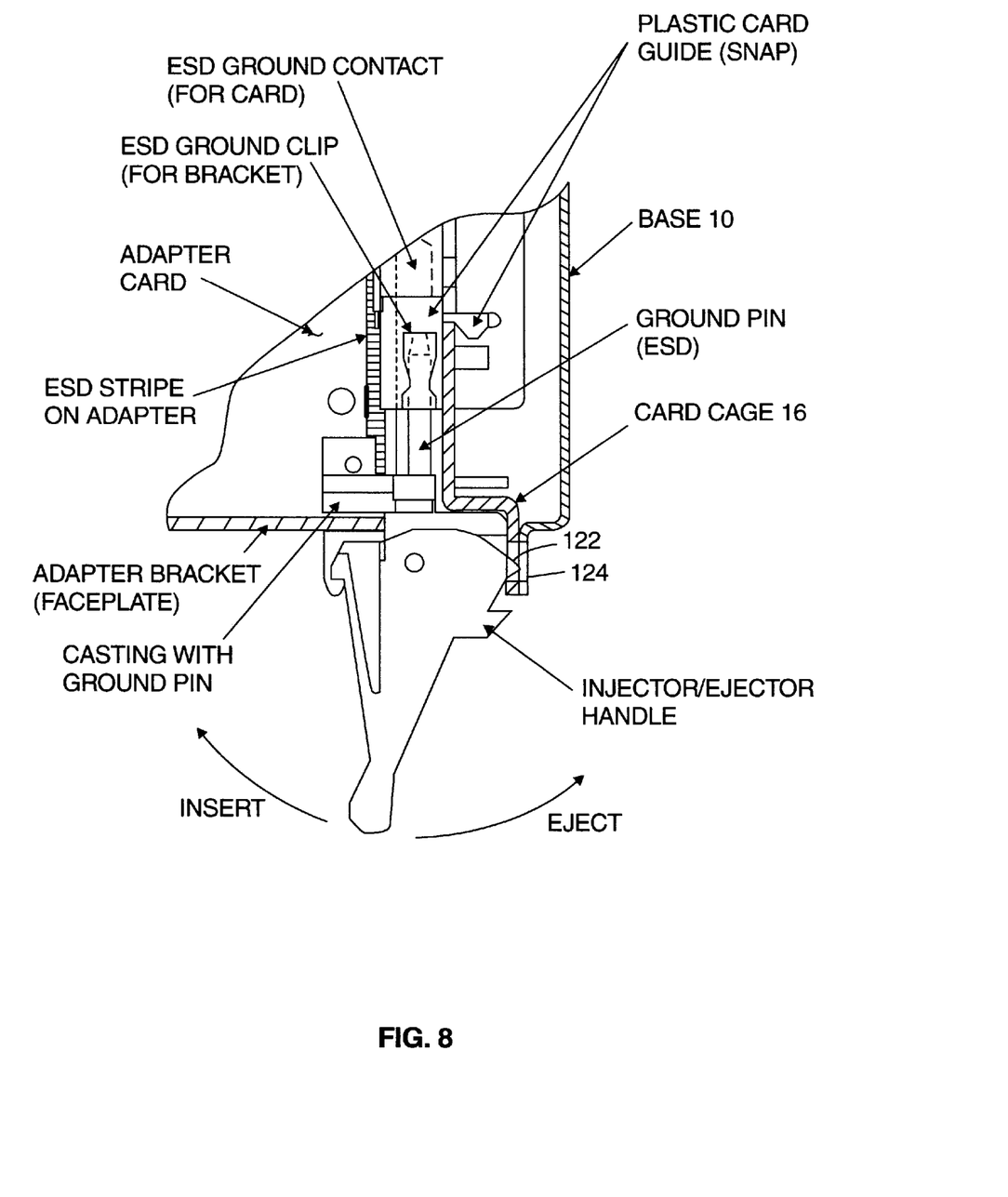
FIG. 8 shows the injector/ejector latching details.

FIG. 8 shows a cross-section of the area where the injector/ejector details on the flanges of the Base 10 and the Card Cage 16 coact with the injector/ejector lever on the card assembly. The interactive junction is the same for all the cards. Therefore, the showing in FIG. 8 is applicable to all junctions. The co-action between the injector lever and the injector/ejector details is such that a force much greater than the applied force is generated to insert or eject the adapter from the backplane. This is particularly important where the connectors have a relatively large number of pins.

Referring again to FIG. 8, each of the surfaces are labeled and to insert the card so that the connector mates, the lever is moved in the direction shown by the arrow labeled insert. As the lever is moved in the insert direction, clockwise, the pin 122 moves through the hole 124 in the guide bracket and the connector on the backside of the card is inserted or mated with the connector on the backplane. Likewise, when the lever is moved in the counter-clockwise ejection direction, the pin is moved in the opposite direction and the connector on the card is ejected from the connector on the backplane. Thus, this mechanical assist device allows easy insert and removal of the connectors at the back of the card and the backplane in the machine. The relevant components, such as adapter card, adapter card faceplate, etc. at the cross-section are labeled in the figure.

In summary, the enclosure, according to the teachings of the present invention includes, Base 10, Top Cover 12 and Card Cage 16. The card cage can be welded to Flange 10-6 or fastened to the base by other means such as screws or rivets. The card cage has injector/ejector latching details thereon that meet the CompactPCI specification. The sides of the card cage are formed in a manner that allows the back surface of an adapter bracket to contact a flat area for good shielding. The Enabler Assembler 18 allows the cavity to be sectionalized into compartments which accept three large (6U) adapters, two large adapters, and two small (3U) adapters or one large adapter and four small adapters. The Backplane 50 can be attached to the Support 14 that could be part of the cage if desired. A Cooling Assembly 56 can be added to push air out the rear of the box through Slots 10-4. Likewise, a Fan Assembly 54 (FIG. 7) can be mounted to further enhance the cooling capacity of the cooling system. The sheet metal design of the present invention can be reused in different configurations to make different products all of which use the same adapter form factor. Therefore, the resulting products are open to vendor adapters and interchangeably through a family of products. The resulting products will be lower in cost than others that are built using higher cost mechanical packages that are designed from independently unrelated units. The manufacturing assembly time will be reduced due to fewer parts and the costs can be very low with high volume.

While the invention has been described with respect to a specific embodiment, it will be obvious to those skilled in this art that changes in both form and/or detail may be made without a departure from the scope and the spirit of the invention.

What is claimed is:

1. A mechanical enclosure for use with electrical machines including:
    a base section, having a bottom, sidewalls including at least one opening through which electrical subassemblies are to be inserted and flanges;
    a card cage having spaced guide rails and injector/ejector latching details connected to the base section;
    an enabler assembly including guide rails mounted to the card cage, said enabler assembly partitioning the card cage into multiple adapter receiving cavities; and
    a cover section carrying tabs that mate with slots in said base section when said cover section is placed on said base section.

2. The mechanical enclosure in claim 1 further including slots that receive and exit cooling air.

3. The mechanical enclosure of claim 1 wherein the card cage includes flanges that are welded to the flanges on the base section.

4. The mechanical enclosure of claim 1 further including a support member connected to the card cage.

5. The mechanical enclosure of claim 4 further including an insulator connected to the support member.

6. The mechanical enclosure of claim 1 further including a power supply connected to the base section.

7. The mechanical enclosure of claim 1 further including at least one fan bracket connected to the base section.

8. The mechanical enclosure of claim 3 wherein the flanges are vertically oriented.

9. An electrical machine including:
    a base section including a bottom and contiguous sidewalls with an opening in at least one of the sidewalls and spaced vertical flanges fabricated relative to the opening;
    a card cage mounted to the base section, said card cage including spaced guide rails and an opening that is positioned in spaced alignment with the opening in the at least one sidewall;
    an enabler, including guide rails, mounted to the card cage and partitioning said opening in a plurality of card receiving cavities;
    a backplane coupled to said enabler, said backplane including electrical connectors and electrical conductors interconnecting said electrical connectors; and
    at least one circuit board assembly mounted in at least one of the card receiving cavities and in electrical communication with said backplane.

10. The electrical machine of claim 9 further including a top section including tabs that mate with prepositional slots in said base section to cover the components in said base section.

11. The electrical machine of claims 9 or 10 further including a support member connected to the card cage; and
   an insulator mounted between the support member and the backplane.

12. The electrical machine of claims 9 or 10 further including a power supply mounted in said base section;
   a.c. cable for providing a.c. power to said power supply; and
   d.c. cable for distributing d.c. power from the power supply.

13. The electrical machine of claim 12 further including a hardfile mounted in said base section.

14. The electrical machine of claim 12 further including a power supply cover mounted to the base section and covering said power supply.

15. The electrical machine of claim 14 further including a blower mounted in said base section.

16. The electrical machine of claim 15 further including a fan.

17. The electrical machine of claim 13 further including at least one bracket for mounting said electrical machine connected to said base station.

18. The electrical machine of claim 9 further including sets of cooling slots fabricated in selected ones of the sidewalls.

19. The electrical machine of claim 9 wherein the card cage further includes injector/ejector details fabricated on said card cage.

20. The electrical machine of claim 19 wherein the circuit board assembly includes a bracket and spaced injector/ejector levers connected to said bracket.

21. The electrical machine of claim 9 wherein the plurality of card receiving cavities includes at least one cavity for a large adapter card and four cavities for small adapter cards.

22. The electrical machine of claim 9 wherein the plurality of cavities includes at least two cavities for large adapter cards and at least two cavities for small adapter cards.

23. The electrical machine of claim 9 further including electrical grounding mechanism operatively coupled to the base section.

24. The electrical mechanism of claim 23 wherein the at least one circuit board includes a grounding strip fabricated thereon and coacting with the grounding mechanism to electrically ground said circuit board.

* * * * *